(No Model.)

J. T. USHER.
MICROMETER INSIDE CALIPERS.

No. 347,844. Patented Aug. 24, 1886.

(Enlarged.)

Witnesses:

Inventor
John T. Usher
by James W. See
Attorney

UNITED STATES PATENT OFFICE.

JOHN T. USHER, OF ELMIRA, NEW YORK.

MICROMETER INSIDE CALIPERS.

SPECIFICATION forming part of Letters Patent No. 347,844, dated August 24, 1886.

Application filed February 19, 1886. Serial No. 192,499. (No model.)

*To all whom it may concern:*

Be it known that I, JOHN T. USHER, of Elmira, Chemung county, New York, have invented certain new and useful Improvements in Micrometer-Calipers, of which the following is a specification.

This invention pertains to micrometer-calipers for accurate admeasurement of sizes, and it relates to an instrument devised especially for use in making inside measurements—as, for instance, in measuring the diameter of holes.

My improvements will be readily understood from the following description, taken in connection with the accompanying drawings, in which—

Figure 1:
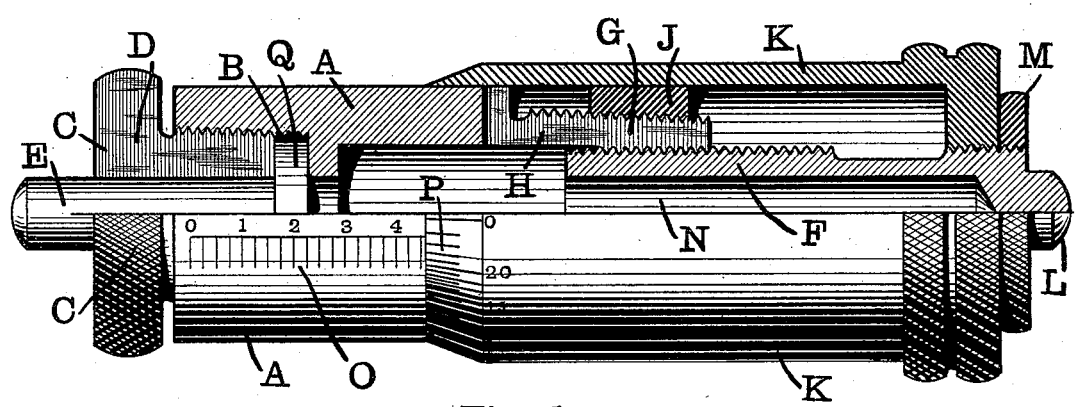
Figure 2:
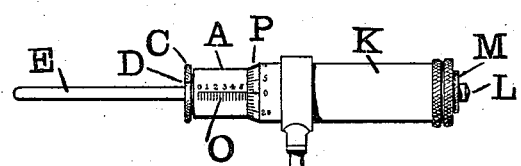

Figure 1 is a side elevation, half longitudinal section, of a device illustrating my invention, and Fig. 2 a similar smaller elevation of the same instrument, with a longer tail-piece and with a handle applied.

Fig. 1 is drawn upon a very much enlarged scale, showing the instrument about four times its natural size. This refers to the original drawings filed with my application, and not to any reproduction of the drawings, which may modify the scale. The full-size instrument in the form shown in Fig. 1 will have a length of about two inches, though of course the instrument may be made of different sizes, adapted for different classes of work.

The reader of this specification will be presumed to have full knowledge of the ordinary micrometer-calipers in ordinary use.

In the drawings, A indicates what I will term the "hub" of the instrument, the same having a cylindrical form; B, a tapered threaded recess disposed concentrically in the outer end of the hub; C, a tapered screw fitting within said recess and provided with a milled head by which it may be turned, the screw having an axial bore; D, a radial cut or split in one side of the screw C, serving to permit the bore of the screw to collapse somewhat when the screw is forced into the recess, thus forming virtually a chuck at the end of the hub; E, a cylindrical tail-piece clamped within the chuck referred to, and having its outer end made convexed and hard; F, the measuring-screw fitted to screw concentrically into the inner end of the hub; G, the inner end of the hub tapered and threaded; H, one or more radial cuts or slits at this part of the hub, to permit of the adjustment of the nut of the measuring-screw as wear takes place, such nut being formed by the inner end of the hub; J, a nut screwed upon the outer portion, G, of the hub, and serving to adjust the fit of the nut of the measuring screw, the periphery of the nut J being preferably cylindrical, and of a size corresponding to the size of the hub A; K, the micrometer-sleeve, of the usual form, disposed concentric with the measuring-screw, upon the outer end of which the sleeve is secured by being screwed; L, the extreme outer end of the measuring-screw, the same being made convex and hard; M, a lock-nut upon the threaded outer end of the micrometer-screw, this nut engaging against the outer end of the micrometer-sleeve; N, a concentric inwardly-opening bore in the micrometer-screw of a diameter not less than that of the tail-piece E; O, a longitudinal series of graduations on the hub; P, a circumferential series of graduations on the beveled inner end of the micrometer-sleeve; Q, a collar upon the inner end of the tail-piece E, and R a handle secured to the micrometer sleeve and projecting at right angles therefrom.

If the hub be held and the micrometer-sleeve be turned, it is obvious that the length of the instrument will be altered proportionately to the pitch of the thread of the micrometer-screw and to the degree of rotation given to the micrometer-sleeve. The measuring screw F may have a pitch of one-fortieth of an inch, and there may be twenty-five graduations in the series P. It follows that each graduation of the series P indicates one twenty-fifth of one-fortieth of an inch, equaling one one-thousandth of an inch. The graduations O should be in the above case fortieths of an inch, and, by being numbered at each fourth graduation in the series, serve in reading the tenths of an inch. The instrument is to be read as is usual with micrometer-instruments of this class. As wear takes place in the threaded fit of the measuring-screw the fit can be adjusted by means of the nut J in an obvious manner. The periphery of the nut J fitting within the micrometer-sleeve serves to furnish the same with a steadying-bearing, and to relieve the measuring-screw from side strains.

The tail-piece E is firmly held in the hub by means of the chuck described, and the tail-piece is subjected to a firm end, clamping against the face of its collar Q, thus insuring that the tail-piece E shall bear a fixed and exact relation to the hub.

For standard measurements it is desirable that the instrument have an accurate determined length—say, for instance, two inches—with the instrument at its minimum length, the zeros on the two sets of graduations coinciding. The parts are designed of substantial proper length, and then the final accurate adjustment can be made by altering the position of the micrometer-sleeve upon the measuring-screw, the lock-nut M serving to permit this adjustment and to make the adjustment secure. This adjustment also permits of corrections in length as the contact-points at the ends of the instrument become worn. Such correction is of course to be made by reference to a test with some proper form of accurate measuring device—such, for instance, as either a fixed or micrometer or vernier outside caliper or measuring-machine.

The removal and replacement of the tail-piece E will not affect the accuracy of the instrument, owing to the positive manner in which the tail-piece is held endwise. In using the instrument its length may be adjusted to fit the surface between which the measurement is desired, and the measurement may then be read upon the graduations; or, in other cases, the instrument may be set by reading to any desired length and then applied to the article for test of size; or, in other cases, the instrument may be set to fit the diameter of the hole, and may then be adjusted the desired degree over or under that size, to serve in controlling the size of the same or other holes or other portions of the same hole.

The handle R serves in applying the instrument into bores or other situations of a depth beyond the reach of the fingers. The handle is removable from the instrument, being held thereon by the mere friction of an encircling band or otherwise.

It is of course to be understood that there may be a variety of tail-pieces, E, to be used consecutively, and thus endow the instrument with either minimum or maximum standards of various lengths. Thus if the standard length of the instrument be two inches with a certain tail-piece, it would become three inches if a tail-piece one inch longer were substituted; but there are in common practice many conditions under which it is desired to measure differences rather than exact distances. In such case one of the distances is measured by the instrument, and then the other distance is measured, and the adjustment involved in the instrument represents the difference in the two distances. In such cases as this it is obvious that it is immaterial what the exact zero length of the instrument is. Such cases as this frequently arise in work-shop practice—as, for instance, when you want a given distance increased a certain degree, as a hole to be bored, say, a thousandth of an inch larger. Such cases are so frequent that it is desirable that the instrument shall be adapted for such use within an extended range of lengths without the necessity for substituting tail-pieces. If the instrument is to be used for the measurement of exact distances beyond its present range, it of course becomes necessary to substitute a new tail-piece; but in case the instrument is desired for measuring distances only, then an extensible tail-piece having no special qualities of accurate length will answer every purpose and make the instrument most convenient for many situations. When the instrument is to be used in such situations, I employ a comparatively-long tail-piece, as illustrated in Fig. 2, and I omit the collar Q from the end of the tail-piece. Such a tail-piece may be adjusted endwise by slacking back the screw C, extending the tail-piece, if desired, and readjusting the screw. The inner end of the long tail-piece is free to enter within the bore N of the measuring-screw, thus adapting a single tail-piece for a very extended range of operation from the minimum capacity of the instrument to nearly double its minimum capacity. The tail-piece thus employed is held in the hub by the forcible circumferential clamping of the screw C, not by any under clamping of the tail-piece. For accurate distance measurement the tail-piece employed will have the collar Q. It is of course to be understood that the outer end of the tail-piece forms nothing more than one measuring-terminal of the instrument, and that this tail-piece is made separable for convenience in extending the range of the instrument. Where the normal range is all that is desired, the outer end of the hub may be formed or provided with an inseparable measuring-terminal.

I claim as my invention—

1. In micrometer-calipers, the combination, substantially as set forth, of a cylindrical hub, A, provided at its outer end with a measuring-terminal and with a longitudinal series of graduations, and having its inner end tapered, threaded, and slitted, an adjusting-nut, J, fitted upon the inner end of the hub, a measuring-screw, F, engaging within the inner end of the hub and provided at its outer end with a measuring-terminal, and a micrometer-sleeve, K, secured concentrically to the measuring-screw and engaging the periphery of the hub, and provided at its inner end with circumferential series of graduations.

2. In micrometer-calipers, the combination, substantially as set forth, of a cylindrical hub, A, provided at its outer end with a measuring-terminal and with a longitudinal series of graduations, and having its inner end tapered, threaded, and slitted, an adjusting-nut, J, fitted upon the inner end of the hub and having a cylindrical exterior of the same diameter as the hub, a measuring-screw, F, engaging within the inner end of the hub and provided at its outer end with a measuring-terminal, and a micrometer-sleeve, K, secured concentrically to the measuring-screw and engaging the periphery of the hub, and provided at its inner end with circumferential series of graduations.

3. In micrometer-calipers, the combination, substantially as set forth, of a cylindrical hub having a longitudinal series of graduations, a circumferential graduated micrometer-sleeve engaging the same, a measuring-screw engaging within the inner end of the hub and secured adjustably through the outer end of the micrometer-sleeve and terminating in a measuring-terminal, and a lock-nut, M, engaging the outer projection of the micrometer-screw and the outer face of the head of the micrometer-sleeve.

4. In micrometer calipers, the combination, substantially as set forth, of a micrometer-screw having an outer measuring-terminal, a micrometer-sleeve secured thereto and having a circumferential series of graduations, a cylindrical hub engaging within the sleeve and forming the nut for the measuring-screw, and having a longitudinal series of graduations, a bored screw, C, threaded into the outer end of the hub, and a tail-piece, E, provided with a collar and adapted to be clamped into accurate end engagement with the hub.

5. In micrometer-calipers, the combination, substantially as set forth, with a graduated hub, measuring-screw, and graduated micrometer-sleeve, of a cylindrical tail-piece, E, and a split tapered screw, C, or equivalent chuck, disposed at the outer end of the hub and adapted to clamp the tail-piece circumferentially.

6. In micrometer-calipers, the combination, substantially as set forth, with a graduated cylindrical hub and a graduated micrometer-sleeve, of a measuring screw, F, having concentric bore N, a cylindrical tail-piece, E, and a tapered and split screw, C, or equivalent chucking device, disposed at the outer end of the hub and adapted to clamp the tail-piece circumferentially.

7. In micrometer-calipers, the combination, substantially as set forth, with a measuring-screw, a graduated cylindrical hub, a graduated micrometer-sleeve, and a measuring-terminal at the outer end of the hub and micrometer-sleeve, of a handle, R, projecting at right angles from the micrometer-sleeve and engaging the same by an engaging-band.

JOHN T. USHER.

Witnesses:
  LEONARD DODD,
  MARTIN O'CONNOR.